United States Patent [19]

Camp et al.

[11] Patent Number: 4,555,549
[45] Date of Patent: Nov. 26, 1985

[54] POLYOXYALKYLENE POLYMERS AS LUBRICANTS PARTICULARLY IN MOLDING PROCESSES

[75] Inventors: Ronald L. Camp, Riverview; Edward M. Dexheimer, Grosse Ile; Michael J. Anchor, Canton Township, Wayne County, all of Mich.

[73] Assignee: BASF Wyandotte Corporation, Wyandotte, Mich.

[21] Appl. No.: 675,018

[22] Filed: Nov. 26, 1984

[51] Int. Cl.$^4$ .............................................. C08L 71/02
[52] U.S. Cl. ................................ 525/409; 106/38.22; 252/11; 252/52 A
[58] Field of Search ................ 525/409, 403; 568/618, 568/625; 252/52 A, 11; 528/419; 106/38.22

[56] References Cited

U.S. PATENT DOCUMENTS 4,129,717 12/1978 Praetorius et al. ............... 252/52 A
4,217,394 8/1980 Newkirk et al. .................. 106/38.22

Primary Examiner—Theodore E. Pertilla
Attorney, Agent, or Firm—Bernhard R. Swick

[57] ABSTRACT

The instant invention relates to a rubber lubricant composition characterized by complete wetting of the elastomer surface both before and after vulcanization which gives a matte finish on cooling down that remains soft and does not flake off. This comprises (1) polyoxypropylene-polyoxyethylene block copolymer having a molecular weight of the polyoxypropylene hydrophobe of about 2500 to 4000 and containing 20 to 80 percent oxyethylene groups and (2) an oxyethylated oxypropylated higher alcohol.

4 Claims, No Drawings

POLYOXYALKYLENE POLYMERS AS LUBRICANTS PARTICULARLY IN MOLDING PROCESSES

BACKGROUND OF THE INVENTION

This invention relates to a composition of polyoxyalkylene polymers and more particularly to polyoxyalkylene compositions as mold release agents or lubricants in molding processes.

In the molding of natural and synthetic rubber and certain other polymers, generally an efficient mold release agent or lubricant is required to overcome the tendency of the polymer to stick to the mold which is often of metal. Both high temperatures and high molding pressures are often encountered in such molding processes. To facilitate the removal of the molded objects, lubricants of the prior art have generally included mineral waxes, vegetable waxes, fatty acids, and metallic soaps which are applied by spray or other methods of coating to the mold surface.

It is also known to use polyoxyalkylene compounds such as block and heteric copolymers of ethylene oxide and propylene oxide for this purpose. An important application is for use as a lubricant in the production of tires and rubber hose. In the latter case it is used as a lubricant to allow easy removal of radiator-type hose from the mandrels used to form the hose during vulcanization. A preferred material for such application is generally referred to as EPDM.

The term "EPDM" is used in the sense of its definition as found in ASTM-D-1418-64 and is intended to mean a terpolymer of ethylene, propylene and a diene monomer. Illustrative methods for preparing such terpolymers are found in U.S. Pat. No. 3,280,082 and British Pat. No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene. This is an elastomer which can be vulcanized; used for automotive parts, cable coating, hose, footwear, and other products. The copolymers employed in the prior art as mold release agents present problems in that they do not give complete wetting on the EPDM elastomer surface and tend to solidify and flake off after vulcanization, thus giving a non-uniform appearance which is found objectionable by customers for these products. It is desirable for such products to give good wetting both before and after vulcanization. Also, the rubber products should have a matte finish, i.e., be free from shine or at least from a high shine and the mold release composition should give complete wetting both at room temperature and 45° C.

U.S. Pat. No. 4,217,394 discloses mold release compositions suitable for lubricating metal molds employing polyoxyalkylene compounds and including mixtures of more than one polyoxyalkylene compound. However an essential compound of the lubricant in question includes in its structure a phenolic residue.

SUMMARY OF THE INVENTION

The instant invention relates to a rubber lubricant composition characterized by complete wetting of the elastomer surface both before and after vulcanization which gives a matte finish on cooling down that remains soft and does not flake off. This comprises (1) polyoxypropylene-polyoxyethylene block copolymer having a molecular weight of the polyoxypropylene hydrophobe of about 2500 to 4000 and containing 20 to 80 percent oxyethylene groups and (2) an oxyethylated oxypropylated higher alcohol.

DESCRIPTION OF THE PREFERRED EMBODIMENTS

The polyoxyethylene-polyoxypropylene block copolymer of use in the invention is a cogeneric mixture of conjugated polyoxyethylene-polyoxypropylene compounds corresponding to the following formula:

$$HO(C_2H_4O)_m(C_3H_6O)_n(C_2H_4O)_mH \qquad (I)$$

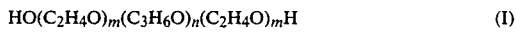

wherein n has a value such that the molecular weight of the polyoxypropylene hydrophobe base is about 2500 to 4000 and m represents from about 20 to 80 weight percent of the molecule. The oxypropylene chains optionally, but advantageously, contain small amounts of oxyethylene and oxybutylene groups and the oxyethylene chains also optionally, but advantageously, contain small amounts of oxypropylene and oxybutylene groups. These compositions are more particularly described including the method of preparation in U.S. Pat. Nos. 2,677,700 and 2,674,619.

The second component of the composition of the instant invention is prepared by the condensation of an essentially linear primary aliphatic alcohol having from 10 to 18 carbon atoms in the aliphatic chain, or, preferably, a mixture of such alcohols with a critical amount of a mixture of ethylene oxide and propylene oxide. The products of the present invention are the products obtained by condensing, on a weight basis, 20 percent to 45 percent alcohol, 30 percent to 55 percent propylene oxide, and 20 percent to 35 percent ethylene oxide. These products are a cogeneric mixture of compounds represented by the following formula:

$$R\text{—}O(A)H \qquad (II)$$

wherein:

R is an essentially linear alkyl group having from 10 to 18 carbon atoms, with the proviso that at least 70 weight percent of said compounds in said mixture have an R of from 12 to 16 carbon atoms, and A is a mixture of oxypropylene and oxyethylene groups, said oxypropylene and oxyethylene groups being from 55 percent to 80 percent of the total weight of the compounds, the oxypropylene to oxyethylene ratio of said total weight being from 0.85:1 to 2.75:1. The R—O in the foregoing formula may also be defined as the residue of the alcohol or alcohol mixture employed in the condensation reaction, i.e., the alcohol or alcohol mixture with the hydrogen of the OH radical removed. These compositions are more particularly described, including the method of preparation, in U.S. Pat. No. 3,504,041.

The term "cogeneric mixture," as used herein, designates a series of closely related homologues that are obtained by condensing a plurality of oxide units with an alcohol or a mixture thereof. (See U.S. Pat. No. 2,549,438, particularly column 2, line 40 et seq.) As is known, when a mixture of compounds of this type is generated, various oxyalkylene chain lengths are obtained. Accordingly, throughout this application when oxyalkylene weight percents are referred to, average weight percents are meant.

The composition of the instant invention contains from about 80.0 to 99.5 percent by weight of the compound of formula I, above, and about 20 to 0.5 percent by weight of the compound of formula II, above. In the process of lubricating a metal mold, the polyoxyalkylene compounds of the instant invention are applied as a two component blend and coated onto the metal mold or mandrel, preferably by spraying.

While the mold release composition of the invention is particularly suited for use with natural and synthetic rubber, particularly EPDM, other polymer compositions ordinarily subjected to a molding operation can be more conveniently used utilizing the mold release composition of the instant invention. The mold release composition of the invention is effective with synthetic rubbers such as styrene-butadiene rubber, neoprene rubber, nitrile rubber, polysulfide rubber, and cis-1,4-isoprene rubbers. Various molded polymers can also be produced using said mold release compositions such as polyurethane polymers, polyesters, polystyrene, polyamides and polyvinyl chloride.

The amount of the mold release composition employed generally will depend on the particular use and the particular polymer with which the mold release composition or lubricant of the invention is employed. Where the mold release compositions of the invention are partially compatible with the high molecular weight polymer, i.e., the elastomer, amounts ranging from about 1 percent up to about 40 percent by weight of said polymer can be employed. However, if the lubricant or mold release composition of the invention is not compatible with said high molecular weight polymer, amounts ranging from about 0.1 up to about 5 weight percent of said polymer are employed.

In accordance with the instant invention, the copolymers of formulas I and II above, may be subjected to filtration treatment. More specifically, upon completion of the polymerization reaction the product is allowed to cool to 80° C. and an absorbent such as magnesium silicate added to the product at levels of 1 to 5 percent. This slurry is stirred for 1 to 3 hours. It is then filtered to remove the absorbent and catalyst used in the reaction.

The polyoxyethylene-polypropylene copolymer may be neutralized with any conventional acid normally used for this purpose. These acids include acetic acid, phosphoric acid, hypophosphorous acid, ethylhexanoic acid, salicylic acid, citric acid, oxalic acid, sulfuric acid, benzoic acid and hydrochloric acid.

The invention will be further illustrated by the following specific examples. Where not otherwise specified throughout the specification and claims, temperatures are in degrees centigrade and parts, percents and proportions are by weight.

In the examples:

Polymer #1 is a polyoxyethylene-polyoxypropylene block copolymer of the type shown in formula I, above, having a molecular weight of the polyoxypropylene hydrophobe of 3250 and containing 30 percent by weight oxyethylene groups.

Polymer #2 is polyoxypropylene glycol having a molecular weight of 410.

Polymer #3 is a polyoxyethylene-polyoxypropylene block copolymer of the type shown in formula I, above, having a molecular weight of the polyoxypropylene hydrophobe of 3250 and containing 50 percent by weight oxyethylene groups.

Polymer #4 is polyoxyethylene glycol having a molecular weight of 400.

Polymer #5 is a polymer of formula II, above, wherein R is a linear alkyl group having 12 to 15 carbon atoms, the total molecular weight is 820 and the percent of oxyethylene groups is 25.

Polymer #6 is a heteric polyoxyethylene-polyoxypropylene copolymer having a molecular weight of the polyoxypropylene groups of 3250 and containing 50 percent by weight oxyethylene groups.

EXAMPLES 1–13

Wetting tests were performed on samples of uncured EPDM elastomer applying the lubricant composition set forth in Table I below to the surface of the elastomer and observing the degree of wetting at room temperature. The coated elastomer piece was then placed in a temperature controlled oven at about a 45° angle and maintained in the oven at the specified temperature, i.e., 45° C. and/or 75° C., for 30 minutes. The surface was then evaluated visually for wetting after a 30 minutes waiting period. In Table I the indication "complete" means that the lubricant composition gave complete coverage of the surface at the indicated temperature and did not contract to leave bare spots. "Partial" means that some bare spots were observed, but that the surface was still at least 50 percent covered by the lubricant. "None" means that less than 50 percent of the surface remained covered by the lubricant composition. The results of these tests are indicated in Table I which follows.

TABLE I

Comparative Evaluation of the Wetting of Unvulcanized EPDM Elastomer by Various Lubricant Compositions

| | | Relative Degree of Wetting | | |
|---|---|---|---|---|
| Example No. | Composition | Wetting at Room Temperature | Wetting at 75° C. | Wetting at 45° C. |
| 1 | 85% Polymer #1 + 15% Polymer #2 | None | — | — |
| 2 | 85% Polymer #3 + 15% Polymer #4 | Complete | — | — |
| 3 | 99% Polymer #1 + 1% Polymer #4 | None | — | — |
| 4 | 98% Polymer #1 + 2% Polymer #4 | None | Complete | Partial |
| 5 | 95% Polymer #1 + 5% Polymer #4 | None | — | — |
| 6 | 90% Polymer #1 + 10% Polymer #4 | None | — | — |
| 7 | 99% Polymer #1 + 1% Polymer #5 | Complete | Complete | Complete |
| 8 | 98% Polymer #1 + 2% Polymer #5 | Complete | — | — |
| 9 | 95% Polymer #1 + 5% Polymer #5 | Complete | — | — |
| 10 | 90% Polymer #1 + 10% Polymer #5 | Complete | — | — |
| 11 | 100% Polymer #3 | None | — | — |
| 12 | 100% Polymer #1 | — | — | None |
| 13 | 100% Polymer #5 | — | — | None |

EXAMPLE 14

A lubricant composition consisting of 99 percent polymer No. 1 and 1 percent polymer No. 5 when employed under actual hose molding conditions exhibits complete wetting before and after vulcanization, and the molded elastomer is characterized by a uniform non-cracking matte appearance.

EXAMPLE 15

A composition of 99 percent Polymer #3 and 1 percent Polymer #5 was prepared wherein Polymer #3 was not filtered but was neutralized with 0.11 percent acetic acid (100 percent) based on the amount of the Polymer #3 and Polymer No. 5 was neutralized with 0.11 percent $H_3PO_4$ (100 percent acid) based on the amount of Polymer No. 5. This composition was subjected to the wetting test set forth in Examples 1–13 and the result was complete wetting at room temperature and 45° C. with a matte finish having no haze after 24 hours at 80° C.

The embodiments of the invention in which an exclusive privilege or property is claimed are defined as follows:

1. A composition of matter comprising: a polyoxyethylene-polyoxypropylene copolymer which is a cogeneric mixture of compounds represented by the formula:

$$HO(C_2H_4O)_m(C_3H_6O)_n(C_2H_4O)_mH$$

wherein n is an integer; the value of which is such that the molecular weight of the oxypropylene groups is from about 2500 to 4000; and the value of m is such that the oxyethylene groups constitute about 20 to 80 percent by weight of the compound and a copolymer which is a cogeneric mixture of compounds represented by the formula:

$$R-O(A)H$$

wherein R is an essentially linear alkyl group having from 10 to 18 carbon atoms, with the proviso that at least 70 weight percent of said compounds in said mixture have an R of from 12 to 16 carbon atoms and A is a random mixture represented by the latter formula of oxypropylene and oxyethylene groups, said oxypropylene and oxyethylene groups being from 55 percent to 80 percent of the total weight of the compounds, the oxypropylene to oxyethylene ratio being from about 0.85:1 to 2.75:1.

2. The composition of claim 1 comprising 80 to 99.5 percent by weight of said polyoxyethylene-polyoxypropylene copolymer and 20 to 0.5 percent by weight said copolymer having a linear alkyl group.

3. The composition of claim 2 wherein said polymers are filtered.

4. The composition of claim 2 wherein said polymers are acid neutralized.

* * * * *

UNITED STATES PATENT AND TRADEMARK OFFICE
CERTIFICATE OF CORRECTION

PATENT NO. : 4,555,549

DATED : November 26, 1985

INVENTOR(S) : Ronald L. Camp et al

It is certified that error appears in the above-identified patent and that said Letters Patent is hereby corrected as shown below:

Claim 1, line 15, after the word "mixture", insert therefor ---represented by the latter formula---.

Signed and Sealed this

Eighteenth Day of February 1986

[SEAL]

Attest:

Attesting Officer

DONALD J. QUIGG

Commissioner of Patents and Trademarks